Feb. 14, 1961 B. C. FAIRFIELD 2,971,254
PILOT BEARING RACE PULLER
Filed April 4, 1957
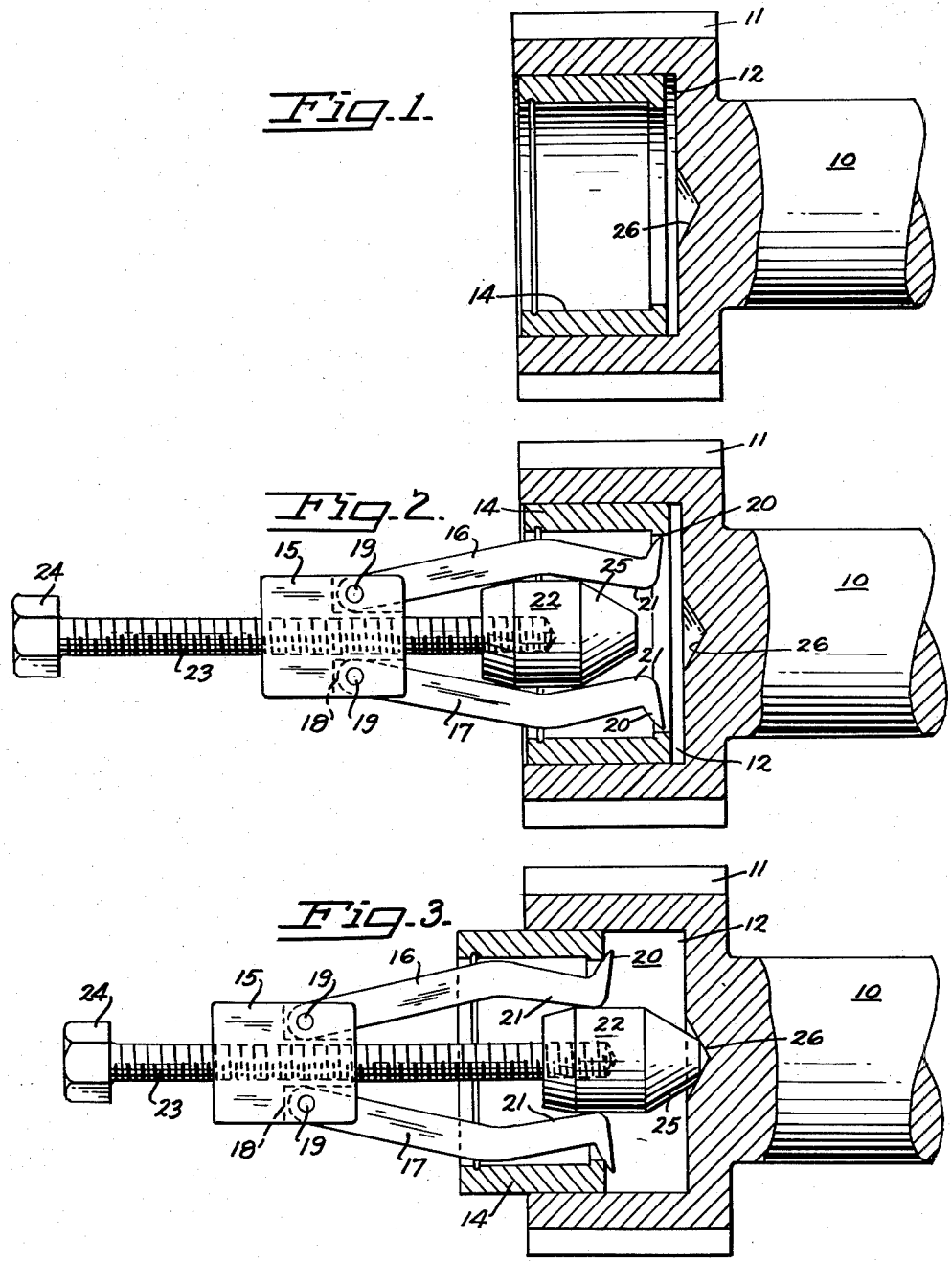
INVENTOR.
BURTON C. FAIRFIELD
BY
*Fryer + Johnson*
ATTORNEYS United States Patent Office 2,971,254
Patented Feb. 14, 1961

2,971,254
PILOT BEARING RACE PULLER
Burton C. Fairfield, 577 Sawyer St., San Francisco, Calif.
Filed Apr. 4, 1957, Ser. No. 650,762
1 Claim. (Cl. 29—261)

This invention relates to a tool for removing objects such as the outer race of a pilot bearing from the cup-like end of a shaft into which it has been pressed and within which it is retained by friction.

The invention will be described herein in connection with its application to the removal of pilot bearing races from their sockets but it is not limited to such use, because, as will be apparent from the ensuing description, the same tool is readily adaptable to the removal of any tightly fitting bushing or annular member from any socket or recess which has a closed end.

It is the object of the present invention to provide a tool that is insertable through a bearing race or annulus and which, through leverage afforded by a screw, is forced to engage behind the annulus and to withdraw it from a socket in which it is disposed.

Further and more specific objects and advantages of the invention are made apparent in the following specification wherein it is described in detail by reference to the accompanying drawing.

In the drawing:

Fig. 1 is a view partially in central section of one end of the main shaft of an automobile transmission with a pilot bearing socket formed in its end and with the outer race of a pilot roller bearing disposed in the socket;

Fig. 2 is a view in elevation of a tool embodying the present invention and illustrated in readiness for removal of a pilot bearing race such as that illustrated in Fig. 1; and Fig. 3 is a view like Fig. 2 but illustrating the positions of the parts of the tool during removal of the bearing race.

In Fig. 1 of the drawings a shaft 10 is illustrated as having a gear 11 formed integrally at its end and having a socket 12 for the reception of a pilot bearing. This view is merely illustrative of any shaft or mechanical part formed with a socket for the reception of a press fitted bearing race or other similarly shaped articles. In Fig. 1 the outer race of a pilot bearing of the roller type is illustrated at 14.

Frequently one of the first parts to fail in an automotive transmisison is the pilot bearing and it is necessary to disassemble the connection between the clutch and the transmission housing in order to expose the bearing for removal and replacement. Since the bearing was originally installed under pressure to provide a tight frictional fit and since it may also have expanded slightly through use, its removal is difficult often necessitating disassembly of the entire transmission and cutting away the race by the use of an acetylene torch or the like.

The tool of the present invention illustrated in Figs. 2 and 3 is designed for the easy removal of such bearing races as well as other similarly shaped and similarly located mechanical parts.

In Fig. 2 the tool is illustrated as having a body portion 15 to which is pivoted a pair of legs 16 and 17. The forward end of the body portion is bifurcated to a depth indicated by the dotted line 18 and pins 19 form the pivotal connection of the body with the legs. At their free ends, each of the legs 16 and 17 have outwardly projecting wedge-like hardened toe portions 20 and inwardly projecting heels which form cam surfaces 21. A main wedge of substantially cylindrical form is illustrated at 22 as disposed between the legs 16 and 17 and carried at the end of a jack screw 23 which extends through a threaded bore in the body 15 and has at its outer end a hexagon head 24 for the application of a wrench by which it may be turned. The cylindrical wedge 22 has a tapered forward end 25 for engagement, when the wedge is advanced by turning of the screw 23, with the heel cams 21 on the legs 16 and 17. The size of the tool is such that with the wedge retracted as illustrated in Fig. 2 the toes 20 pass easily through the annulus to be removed from a socket. With the tool in this position and the toes 20 in alignment with the small space behind the annulus to be removed, the shaft 23 is rotated to advance the wedge 22 and spread the legs until the toes 20 engage behind the annulus to be removed. The tapered portion 25 of the wedge causes a spreading and the cylindrical portion maintains the legs in their properly spaced position while further advancing of the wedge causes its nose to engage the bottom of the socket which is usually provided with a central conical depression as indicated at 26. However such a depression is not essential because in any case a further advancing of the wedge with respect to the legs 16 and 17 effects retraction of the legs and the annulus in the manner illustrated in Fig. 3.

As is apparent from the foregoing description, the tool of the present invention uses the action and leverage of a single, simple screw, first to form a positive engagement behind the annulus to be removed, and then to exert a force which withdraws the annulus from its socket.

The wedge 22 is preferably connected to the end of the shaft 23 by a threaded connection or other means which permits its removal so that wedges of different size may be used to accommodate the tool to bearing races of different sizes. In the present illustration the heel portions of the legs 16 and 17, as well as the forward portion 25 of the wedge are shown with cam-like surfaces. A similar camming action may be obtained without employing the tapered front end on the wedge 22 though the action is considered somewhat smoother and less susceptible to wear with the design illustrated.

I claim:

A tool for removing an annulus from a socket comprising a body member, at least a pair of legs spaced apart and connected to said body memberm at one end so as to permit the other ends of the legs to be spread apart, hooking means on the other end of each leg extending at an angle therefrom to engage a surface of said annulus, a jack screw threaded through said body member and having a first end and a second end, said first end being disposed between said legs, said second end having a head to accommodate force applying means, a cylindrical body on said first end of said jack screw, said jack screw having threads extending from said head to said cylindrical body, said cylindrical body having a cylindrical main portion, said legs each having a recess intermediate said hooking means and said connected end for partially accommodating said main portion when said main portion is positioned intermediate said hooking means and said body member, and said legs converging towards each other at the end carrying said hooking means, said cylindrical body having a tapered first end adapted to spread said hooking means to underlie said annulus when said jack screw is rotated so as to advance said tapered first end past the portion of the legs converging towards each other, said cylindrical body adapted to engage the bottom of said socket upon further advancing of said screw, said cylindrical main portion maintaining said legs a selected distance apart upon further advancing of said jack screw such that while said legs retract said annulus at least partially from said socket said legs will be prevented from radial movement toward said jack screw.

References Cited in the file of this patent

UNITED STATES PATENTS

| | | |
|---|---|---|
| 1,473,075 | Bates | Nov. 6, 1923 |
| 1,621,734 | McCord | Mar. 22, 1927 |
| 1,893,414 | Johnson | Jan. 3, 1933 |
| 1,958,330 | Beard | May 8, 1934 |
| 2,380,068 | Patton | July 10, 1945 |